April 4, 1961    B. B. BECKER    2,978,129
HYDRAULIC HOSE TAKE UP
Filed July 23, 1958    5 Sheets-Sheet 1
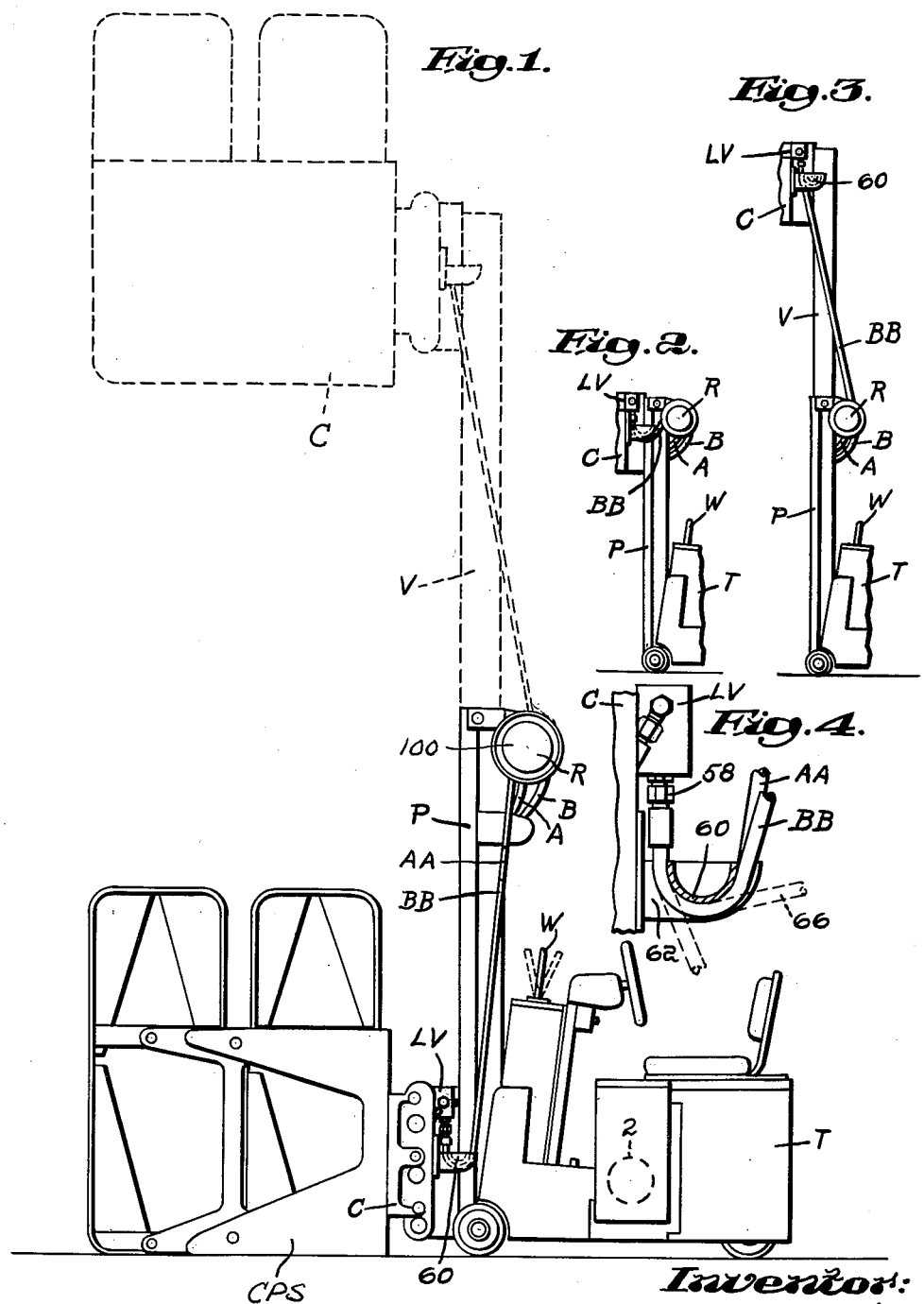
Inventor:
Bernard B. Becker,
by Porter, Chittick & Russell
Attorneys

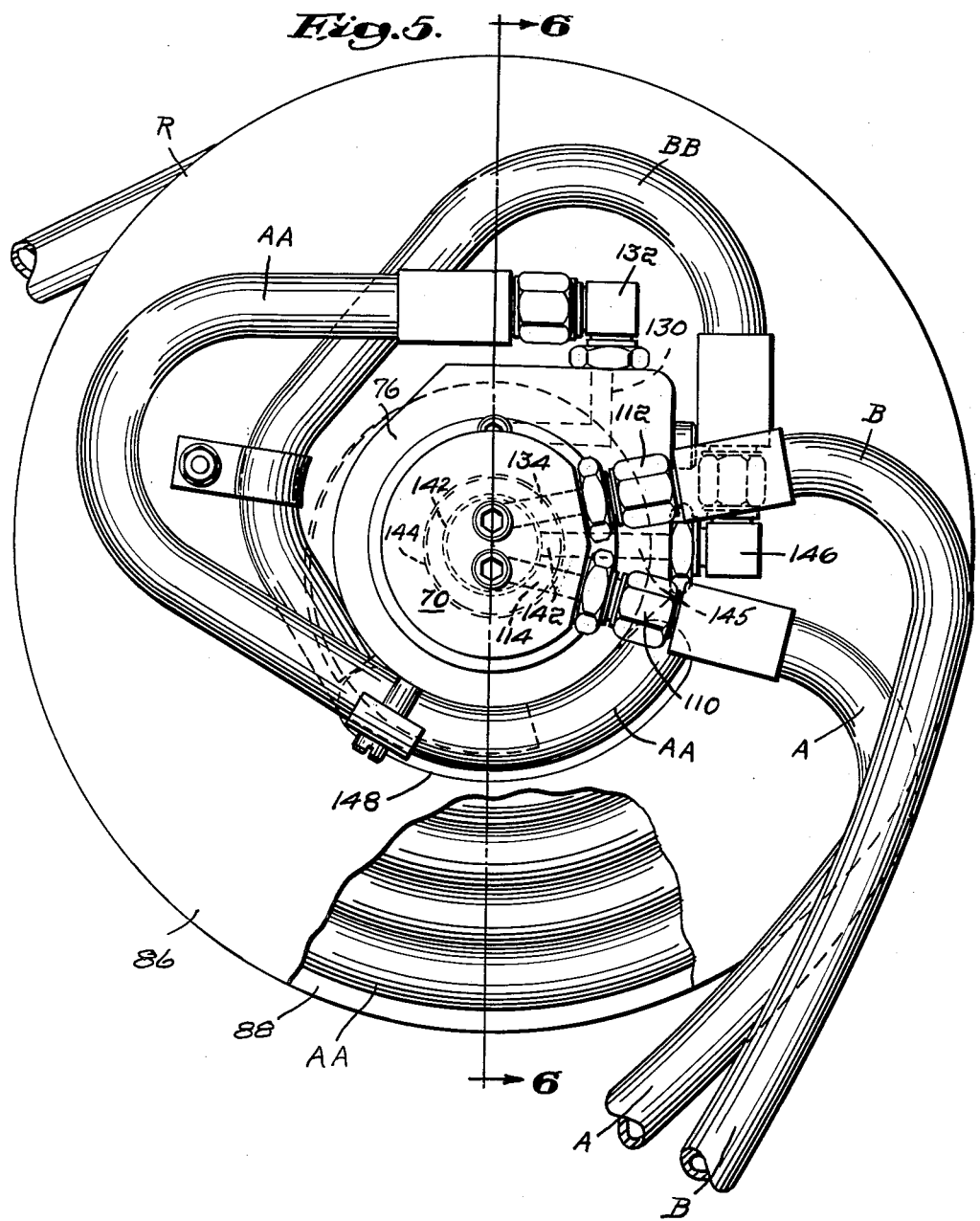

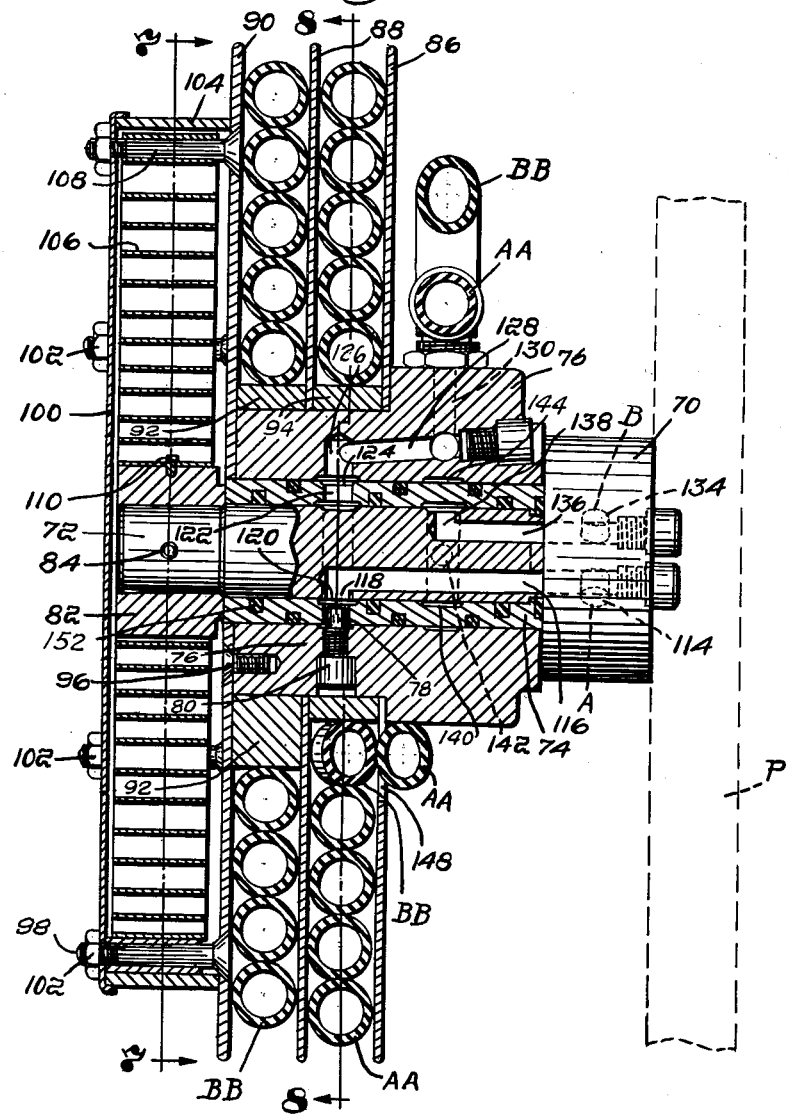

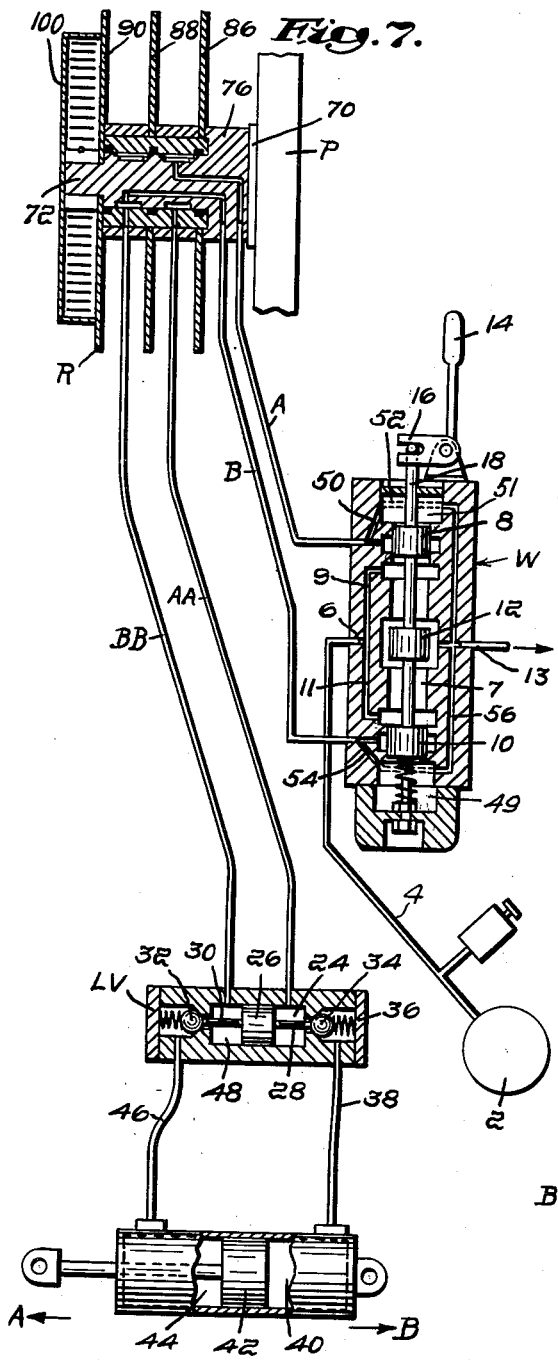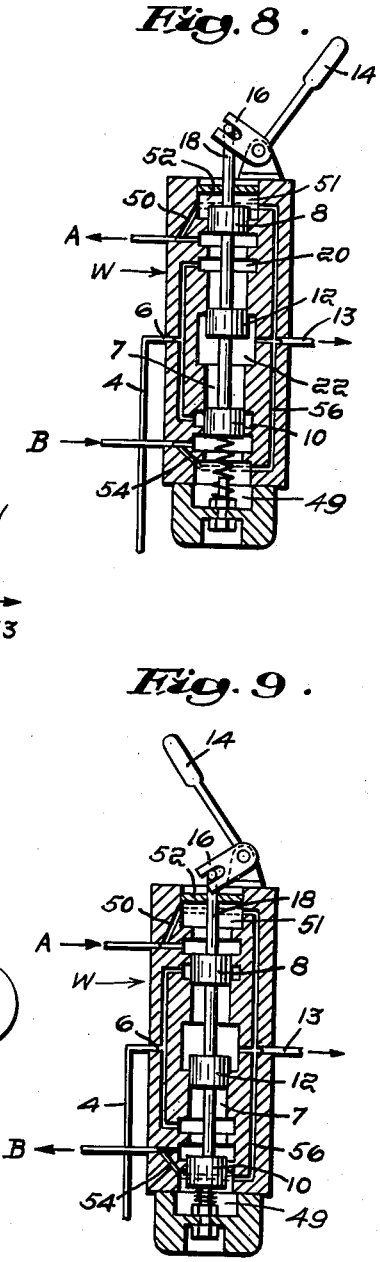

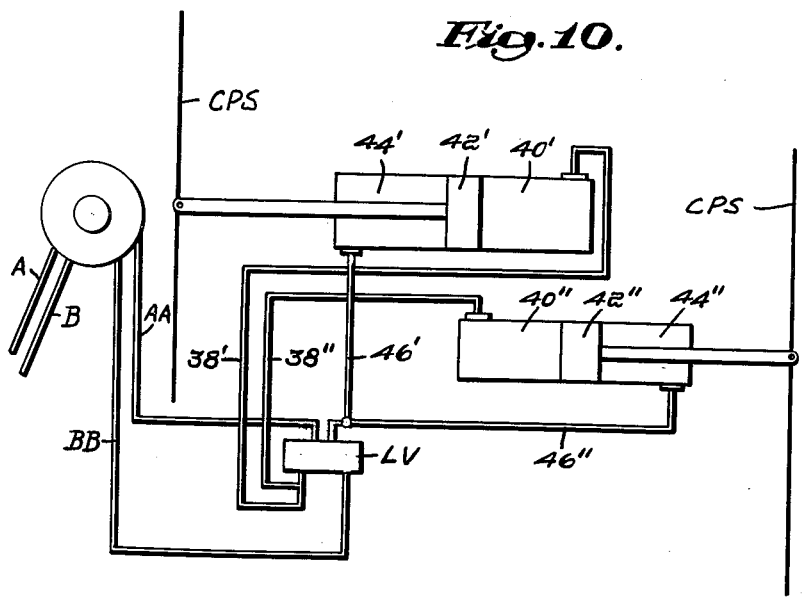
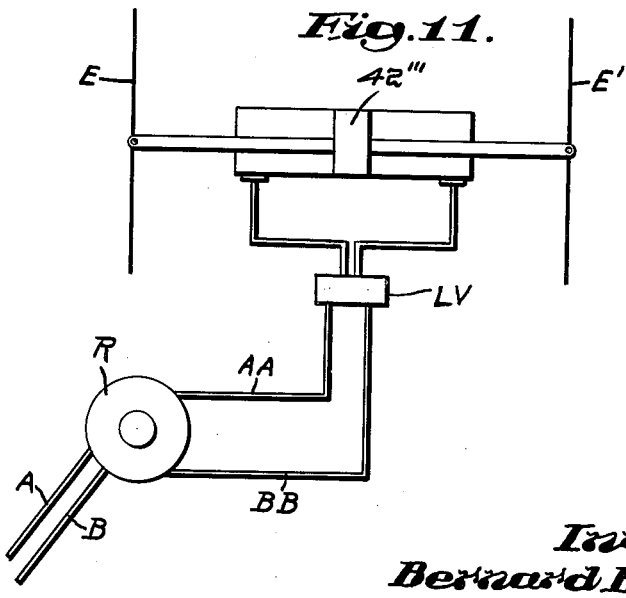

United States Patent Office 2,978,129
Patented Apr. 4, 1961

2,978,129

HYDRAULIC HOSE TAKE UP

Bernard B. Becker, Belmont, Mass., assignor to Lewis-Shepard Company, Watertown, Mass., a corporation of Massachusetts Filed July 23, 1958, Ser. No. 750,394

7 Claims. (Cl. 214—653)

This invention relates generally to industrial trucks of the type which have moving elevating platforms or forks for carrying and stacking loads and which frequently require fluid operated cylinders and other fluid operated devices on the elevating member in order to manipulate the pay load by clamping, rotating, pushing, sideshifting, etc.

To convey the hydraulic fluid to and from the elevating carriage, from one to six hose lines are commonly used. It is desirable to keep these lines properly positioned within the confines of the truck and free from slack to avoid fouling, chafing, or kinking of the hose while the truck is traveling or elevating. The hose take up system disclosed herein is intended to meet these requirements.

Another objective is to provide a hose take up assemblage that is readily adaptable to various types of existing industrial lift trucks. The chassis of these trucks are necessarily very compact and vary considerably in configuration, making it undesirable and with many types impossible to install a hose take up system within them.

Accordingly, by the provision of a reel type hose take up that is compact enough to be utilized in the normally unused space at the top outer corners on both sides of the fixed mast on a truck, several gains are made. The total amount of hose which must be taken up on the reel for a given carriage elevation is reduced to approximately one-half that required if the reel were mounted near the base of the mast or in the chassis, as the hose is reeled in during the lower part or first half of the elevating movement and reeled out during the upper part. Reduction in hose length results in a sizeable reduction in reel diameter and also in the size of the required rewind spring. It also reduces fluid pressure drop and power loss at the work cylinders and simplifies installation and maintenance.

Another object of the invention is to provide improved operator visibility as compared with the visibility found on trucks using the conventional sheave type of take ups which are necessarily located at operator eye level at the side of the mast, or within it.

Another object of the invention is to develop an economical design with the assurance of long maintenance free operation with transmission pressures in the order of 1500 to 3000 pounds per square inch. It is well known to those familiar with the subject that zero leakage sealing of rotating type hydraulic joints with conventional low cost resilient sealing members introduces the problem of high and variable friction forces between the rotating surfaces and seals, with rapid wear of the latter. The life of these seals is determined to a considerable extent by the degree of pressure to which they are subjected while rotation occurs, as they are squeezed by fluid pressure against the sealing surfaces and into the clearance space to accomplish sealing. While more complex types of sealing arrangements are possible, added cost of manufacture and additional space requirements generally prohibit their use.

To assure maximum seal life, and also to reduce rotating seal friction to a minimum, which in turn contributes to a smaller and less expensive rewind spring, the hydraulic circuit is arranged to release pressure from the seals and hose prior to rotation of the reel. The advantage is achieved through the use of a cylinder lock valve located on the elevating carriage with a conventional four-way, open center control valve modified to permit shockless release of the fluid under pressure from the reel and hose lines between the carriage and control valve when the latter is in its neutral position.

This circuit provides several other advantages. It is inherently safe, as failure of the seals or hose lines from the control valve to the carriage will not affect the holding pressure in the cylinders, loss of which would cause dropping of heavy loads. The holding pressure is maintained by the cylinder lock valve.

When a cylinder is operated, one of the hoses to it is subjected to high pressure while the other hose carries return flow at relatively low pressure. Diametral expansion of the hose under high pressure causes it to shorten; in practice in this field this is normally expected to be 4 inches or more. By releasing pressure in the high pressure hose, unequal slack and stiffening is avoided during reel rotation, thus minimizing the tendency for the hose to stiffen and escape from the reel groove during winding thereon and eliminating the necessity for a circumferential hose retaining member on the reel.

A further object of the invention is to provide a hose anchorage at the carriage which will obviate the need for hydraulic swivel joints, yet accommodate the wide angular travel of the hose ends at this junction point. The hose ends are connected into the cylinder lock valve at the carriage, and a curved member is located just below it to guide the hose. When the carriage is at the lower part of its travel, the hose is guided around this curved member at the proper hose bend radius to prevent kinking or collapse of the hose. During the upper part of the elevation, the hose leaves this member and passes directly from reel to cylinder lock valve.

The foregoing objects and others will become more apparent as the description proceeds with the aid of the accompanying drawings in which Fig. 1 is a side elevation of an industrial truck of the type in question showing the general arrangement whereby the invention is incorporated therein. The dotted lines show the elevating member in raised position.

Fig. 2 is a fragmentary view of Fig. 1 to somewhat smaller scale showing the elevating member in approximately halfway up position and with the hose almost completely wound on the reel.

Fig. 3 is a fragmentary view of Fig. 1 showing the elevating member in fully raised position with the reel unwound and the hose in fully extended position.

Fig. 4 is an enlarged fragmentary view showing the means for connecting the hose to the elevating member and its relation to the lock valve.

Fig. 5 is an enlarged side elevation of the reel, of which there may be one or more as required, and showing the hose connections leading to the reel and the means whereby the inner ends of the hoses that are connected to the elevating member are introduced into the reel.

Fig. 6 is a vertical section taken on the line 6—6 of Fig. 5.

Figs. 7, 8 and 9 show the valve controls for the hydraulic system. In Fig. 7, the control valve is in neutral position. In Fig. 8, the valve has been shifted to cause movement of one or more of the pistons of the work cylinders in one direction, while Fig. 9 shows the valve shifted to the other position to cause reverse movement of the piston or pistons.

Fig. 10 shows one arrangement whereby a single lock valve and one pair of hoses controls the operation of two pistons to produce clamping and unclamping action.

Fig. 11 shows another arrangement of the hydraulic system whereby a single piston may be moved in either direction as desired to control instrumentalities connected therewith.

As explained above, the invention is generally related to industrial trucks of the type having hydraulically operated pistons for controlling instrumentalities designed to grip, pick up, move and release pay loads by clamping, rotating, pushing, sideshifting, etc. These are conventional devices, and it is to be pointed out that the invention does not reside in the truck or lifting mechanism or the clamping or sideshifting devices, but rather in the mechanism whereby hydraulic pressure generated by conventional pumping mechanism is transmitted from the pump to the fluid actuated elements. The essential elements of the present invention comprise those elements which may be most clearly seen schematically in Figs. 7, 8 and 9 and which will be located for ready reference in Fig. 1.

The truck T has secured thereto a fixed post P and a vertically movable post V. The latter is caused to move up and down in relation to post P through the actuation of conventional mechanism, usually in the form of cooperating hydraulically operated elements. These need not be described herein as they are well known and in common use in this type of truck. On the upper end of fixed post P is a reel R of novel construction which is designed to receive fluid under pressure through the relatively fixed pipes A and B and to transmit the fluid to a pair of related hoses AA and BB which run from the reel R to a cylinder lock valve LV which is affixed to the carriage C. The carriage C has the hydraulically operated devices associated therewith. The carriage C is also connected with the vertically movable post V in a manner permitting the carriage to be moved vertically from floor level to a maximum raised position as shown in dotted lines in Fig. 1. The clamps CPS illustrate one form of device which may be actuated by the present invention. These are controlled by hydraulically moved pistons all under the control of the operator through the actuation of a four-way valve indicated at W in Figs. 1, 7, 8 and 9.

The valve W is of novel construction and arranged to cooperate with the lock valve LV so that after the hydraulic pistons have been brought to the proper position the valve W on being returned to neutral will permit release of the high pressure in the hoses AA or BB as the case may be without causing corresponding release of the clamps or other similarly operated instrumentalities. Then as the carriage C is moved up, for example, the hoses AA and BB will wind up on the reel R until the carriage C reaches and passes the reel as shown in Fig. 2 and thereafter as the carriage continues upward the hoses will unwind from the reel until the upper position of the carriage C is reached as shown in Fig. 3. Then valve W may again be actuated to cause the pistons to function to release the clamps, for example, as may be required. Since the hoses AA and BB are not under pressure as the reel R winds them up and then pays them off, the life of the hoses is greatly increased as well as the fluid seals that are present in the reel R and which will be shown in detail hereinafter.

Now referring to Figs. 7, 8 and 9, the hydraulic system which includes the novel valve W, reel R, and lock valve LV will be described.

A fluid pressure pump 2 located in truck T may be in continuous operation to force fluid through pipe 4 into the four-way valve W at the port 6. With the valve in neutral position as shown in Fig. 7, fluid passes into central chamber 7 through the two entrance passages 9 and 11 and flows therefrom through the port 13 back to the pump supply tank. Valve W includes a piston valve having an upper valve 8 which controls the port leading to pipe A, a lower valve 10 which controls the port leading to pipe B, and a middle valve 12 which functions in cooperation with elements 8 and 10. When the operating handle 14 is swung to the right as shown in Fig. 8, the piston valve will be raised by cooperation of the forked element 16 with shaft 18. This moves valve 8 upwardly so that fluid under pressure enters through port 6, passes into cavity 20, and thence into pipe A, putting the fluid in pipe A under maximum pump pressure.

Valves 12 and 10 cooperate to block flow of high pressure fluid to pipe B or to return pipe 13. Accordingly fluid under pressure then flows through pipe A to hose AA through the instrumentality of the novel reel mechanism R. Hose AA terminates in the lock valve LV leading into cylinder 24 to drive piston 26 to the left. Piston 26 has extending from either side thereof axially aligned pins 28 and 30. As piston 26 moves to the left, pin 30 forces ball valve 32 away from its seat. While this is happening the fluid in cylinder 24 presses against ball valve 34 forcing it from its seat and compressing spring 36. Fluid passing ball valve 34 then flows into pipe 38 and cylinder 40 to move piston 42 to the left. Piston 42 is representative of any hydraulically actuated element on the carriage C. Fluid in cylinder 44 may then escape therefrom by flowing through pipe 46 past open valve 32 into cylinder 48 and thence through hose BB and through the reel connection to pipe B and through chamber 49 to return 13. It will be understood, of course, that there is no continuous flow of fluid through pipes A, AA, BB and B. Flow ceases when piston 42 has reached final position.

When the piston 42 has been moved the required extent into clamping position, for example, with the fluid in cylinder 40 under full pressure, the operator will then return lever 14 to neutral so that valves 8 and 10 close the entrances to pipes A and B. This would normally maintain the pressure then present in pipe A. However, there is related to pipe A in the valve W a bleed 50 of small diameter in relation to pipe A through which fluid may flow in limited quantity through a bypass 52 to the return 13 to the tank. In this way with the valve in neutral the pressure in pipe A and hose AA is quickly but gradually relieved so that the valve 34 will be returned immediately and before appreciable pressure drop to its seat by spring 36. With valve 34 closed, the pressure then existing in cylinder 40 will be maintained as there is no longer any escape through pipe 38. In this way piston 42 is automatically locked in position under pressure even through there is no longer any fluid pressure in hose AA. Likewise there will be no pressure in hose BB. This is of importance as it permits the hoses AA and BB to be wound on the reel R under conditions of equal length and no pressure. It should be pointed out that when the hose AA is under pressure as in the circumstances just explained with the pressure being in the order of 1500 to 3000 per square inch, the hose will increase somewhat in diameter and shorten in length. If an attempt were made to wind hoses AA and BB on the reel with AA under pressure and BB not under pressure, difficulty would be encountered and the life of the equipment greatly shortened. Therefore, the elimination of pressure in the hoses AA and BB during the winding on and unwinding from the reel is to be recognized as an important feature.

When the operation performed by the carriage and the piston operated elements has been completed and reverse movement of the piston 42 is to be initiated, the operator moves the lever 14 in the opposite direction as indicated in Fig. 9. This pushes the piston valve downwardly, opening pipe B to high pressure fluid and permitting return flow through pipe A, chamber 51 and pipe 13. The situation is just the reverse of that found in Fig. 8. In this way fluid under pressure flows through pipe B, through the reel connection, and into hose BB through lock valve LV and pipe 46 into cylinder 44 to move piston 42 to the right. When it has moved sufficiently, the operator shifts lever 14 back to neutral, at which time the pressure in hose BB is relieved by virtue of back flow through bleed 54 through the bypass 56 to tank pipe 13. With the pressure relieved in hoses AA and BB, the carriage C may again be operated so that the reel comes into operation winding up the hose as the carriage descends to mid position and then unwinding it as the carriage descends further to lowermost position.

An explanation will now be given of the means for connecting the hoses AA and BB to the lock valve LV. This arrangement is shown in detail in Fig. 4. The lock valve LV is rigidly attached to the carriage C and the hoses AA and BB preferably lead into the under side thereof as indicated by the connections 58. A short distance below lock valve LV is a semicircular element 60 affixed at its ends to a pair of spaced bars 62 which are welded to the carriage C. The curvature of element is such that the hoses AA and BB may turn therearound without damage. When the carriage C is in down position and as shown in Figs. 1 and 4, the hoses are substantially doubled about the element 60. When the carriage has risen to the position of Fig. 2, the hoses will be in approximately the dotted line position 66 of Fig. 4. When the carriage has risen to the position of Fig. 3, the hoses will extend almost straight downwardly from the lock valve LV to be out of engagement with element 60 except at the inner side thereof. By this means the connections at 58 may be of a permanent fixed nature. Swivel joints and their attendant leakage is completely avoided. No undue wear on the hose is caused because there is no frictional engagement with the curved element 60. The hoses merely wrap themselves thereon as the carriage moves up and down without relative sliding.

The reel construction which permits connection of the fixed pipes A and B with the hoses AA and BB will now be explained. Referring first to Fig. 5, the reel R is shown in side elevation looking from that side which is affixed to the post P. This is the reverse direction from which the reel R is seen in Fig. 1. The reel comprises a shaft supporting base 70 which is secured by any convenient means directly to the upper portion of post P indicated in dotted lines in Fig. 6. A horizontal shaft 72 preferably integral with base 70 extends therefrom to support the reel and rewind spring. The construction of this as best seen in Fig. 6 is as follows: Shaft 72 carries a bushing 74 which is free to rotate on shaft 72. A hub 76 resides on the bushing and is connected with the bushing by a pin 78 on the inner end of screw 80. Thus as hub 76 may be rotated bushing 74 correspondingly rotates on shaft 72. Shaft 72 is somewhat reduced in diameter at its outer end to receive a collar 82 which is pinned to shaft 72 at 84. Collar 82 maintains bushing 74 and hub 76 in place on shaft 72. Mounted concentrically on hub 76 are three spaced plates 86, 88 and 90. These plates are separated at their inner portions by soft rubber cam shaped spacing elements 92 and 94. Plate 90 is secured to the face of hub 76 by a plurality of screws 96, one of which is shown. Spacing cams 92 and 94 are initially somewhat wider than as shown but are squeezed into position as the screws 96 are set up. The frictional engagement of spacer elements 92 and 94 with the sides of plates 86 and 88 are effective to prevent rotation of these plates on hub 76 without the need of further securing means.

Plates 86, 88 and 90 provide the annular grooves in which the hoses AA and BB are wound and unwound.

Plate 90 has extending therefrom a plurality of short rods 98 (see Fig. 6) threaded at their outer ends which are adapted to receive and maintain in position an outer cover plate 100 secured by suitable nuts 102. Cover plate 100 is spaced from plate 90 by a short cylindrical element 104. A spiral rewind spring 106 has one end secured to pin 108 and its other end secured to collar 82 by means of a short diagonally disposed pin 110, the outer end of which extends sufficiently above the surface of the collar to enter into a corresponding hole in the spring end. Thus if by any chance the reel should inadvertently be turned in the wrong direction no damage will be done to the spring as the inner end will merely then slide off pin 110 and continue around in the wrong direction until the movement ceases. Thereafter when movement in the right direction is resumed, the hole in the spring will drop over the end of the pin 110 so that the spring will again be secured to shaft 72.

From the foregoing explanation, it can be seen that when the plates 86, 88 and 90 are rotated clockwise as viewed from the left in Fig. 6, the spring 106 will be wound up about stationary shaft 72 and when released will unwind to resume its original position.

Referring again to Figs. 5 and 6, the mechanism whereby the pipes A and B are connected to hoses AA and BB will be explained. As shown in Fig. 5, the pipes A and B, which are relatively fixed and lead upwardly from the pump 2, terminate in stationary vertically aligned fittings 110 and 112 respectively mounted on base 70. These fittings are in fluid connection with appropriate ports in the base 70, which can be seen in Figs. 5 and 6. Pipe A through fitting 110 leads into port 114, which in turn leads to a longitudinal passageway 116 in shaft 72. This passageway terminates in a radial port 118, which leads into an annular groove 120 about the interior of bushing 74. A port 122 through bushing 74 permits fluid to reach another annular groove 124 about the interior of hub 76. From this groove and aligned with port 122 extends a short radial passage 126 connecting with passage 128, which in turn leads to another radial passage 130 extending to the exterior of hub 76. This passage in turn connects with an elbow fitting 132 (see Fig. 5), to which is secured the inner end of hose AA. By the mechanism just described, fluid can pass from the stationary pipe A connected to the stationary base 70 to the rotatable hub 76 and the elbow fitting 132 at the commencement of hose AA.

In a similar manner pipe B is connected to the inner end of hose BB. In this case the fitting 112 leads into a radial opening 134 in base 70, which leads into passageway 136 and thence into radial port 138. This port feeds into the interior annular groove 140 on the inside of bushing 74, thence outwardly through port 142 in bushing 174 to an outer circumferential groove 144 which is in connection with a radial passage 145 through hub 76 leading to a second elbow fitting 146. This fitting is connected with the inner terminal end of the hose BB.

As can best be seen in Figs. 5 and 6, the hoses AA and BB are then led around the exterior of hub 76 for something less than a full turn whence they pass inwardly through an arcuate opening 148 in plate 86 (see Figs. 5 and 6). Hose BB is the first to pass through opening 148 whence it crosses over the space between plates 86 and 88 and then passes through a similar arcuate opening in plate 88. In this way hose BB can be carried to the space between plates 88 and 90 and reeled up therein. Similarly hose AA as shown in Fig. 5 enters through opening 148 in plate 86 to be wound up between plates 86 and 88. The outer ends of hoses AA and BB are then lead from reel R to the lock valve LV, passing on their way under the curved anchoring element 60. To improve winding of the hoses, the first turn of hose BB rests on cam shaped element 92 and the first turn of hose AA rests on cam shaped element 94.

The wound up condition of the two hoses shown in Figs. 5 and 6 represents the condition that prevails on the reel as the carriage C is in the position shown in Fig. 2. When the carriage is in the position shown in either Figs. 1 or 3, most of both of the hoses would have been unwound from the reel and the spring 106 would be in wound up condition ready to rewind the hoses on the reel as the carriage thereafter approaches the reel.

In order to prevent fluid leakage between the hub 76, bushing 74 and shaft 72, there are provided a plurality of O rings 152 suitably located in annular grooves in both the exterior and interior of bushing 74. Since, as previously explained, fluid pressure is applied to pipes A and B and the related hoses AA and BB only when the carriage C is stationary, it follows that the hub 76 at this time will not be in rotation. Hence the O rings will be stationary with respect to shaft 72 thereby greatly minimizing wear and increasing their effectiveness as liquid seals. When the carriage C is to be moved vertically, pressure in the pipes and hoses will have been released so that both hoses will be of substantially equal length and flexibility whereby they will wind up readily on the reel, and the O rings, no longer being under sealing pressure, will likewise rotate readily on shaft 72.

In the disclosures in Figs. 7, 8 and 9, a single piston 42 was caused to operate. Alternative arrangements of this nature are shown in Figs. 10 and 11.

In Fig. 10, the hose line AA, after reaching lock valve LV, divides into two lines 38' and 38" so that pressure from the single hose AA may be made effective in two cylinders 40' and 40", thus causing simultaneous movement of two pistons 42' and 42". In this way, for example, only opposed clamping elements can be simultaneously moved apart. When the pressure is in hose BB, the fluid is carried by two lines 46' and 46" to the other sides of the pistons in cylinders 44' and 44" to cause the clamping elements to move in the opposite directions. Thus by means of a single control valve, various piston effects may be obtained.

The arrangement in Fig. 11 is generally similar to that shown in Fig. 7 and provides for moving a single piston 42''' in one direction or another thereby to shift the elements E and E' simultaneously to the right or to the left. This arrangement might be used to shift the carriage C to one side or the other with respect to the truck T.

It is my intention to cover all changes and modifications of the example of the invention herein chosen for purposes of the disclosure which do not constitute departures from the spirit and scope of the invention.

I claim:

1. In a material handling truck, a source of fluid pressure, a fixed post, a vertically movable post having a fluid actuated element mounted thereon, means for transmitting fluid pressure from said fluid pressure source to said fluid actuated element, said means comprising a reel mounted on said fixed post, a conduit running from said fluid pressure source to a non-rotatable part of said reel, a hose connected to the rotatable part of said reel and extending to said fluid actuated element, means for transmitting said fluid pressure from said conduit through the non-rotatable part of said reel to the point of connection of said hose with said reel, a spring urging said reel to wind up said hose, means for maintaining pressure at said element while relieving the pressure in said hose prior to winding said hose on said reel.

2. In a material handling truck of the type having a fixed post and a second post vertically movable with respect to said fixed post, a source of fluid pressure, a reel mounted on said fixed post, said reel having a non-rotatable core, a conduit extending from said fluid pressure source to said core, a valve intermediate said conduit for controlling the flow of fluid therethrough, a fluid actuated element on said second post, a hose having one end connected to said reel and the other end connected to said fluid operable element, means at said reel connecting said conduit with said hose, means constantly urging said reel toward wound up position whereby as said second post is moved vertically with respect to said fixed post said hose will progressively be wound on said reel as said fluid actuated element approaches said reel and will be payed off said reel as said fluid actuated element moves away from said reel, a lock valve for maintaining fluid pressure at said element, and means for reducing the pressure in said hose prior to vertical movement of said element.

3. In a material handling truck, a pump, a reel fixed on said truck, a hydraulically operated device mounted on a vertically movable element, pipes extending from said pump to said reel, hoses extending from said reel to said device, means in said reel for causing said hoses to be wound on said reel as said element is moved toward said reel and to permit said hoses to be unwound from said reel as said element is moved away from said reel, means associated with said reel permitting continuous fluid communication between said pipes and hoses, valve means on said truck for controlling the flow of fluid from said pump to said device, a lock valve on said element intermediate said reel and device and in series with said hoses, means for relieving pressure in said hoses while maintaining pressure in said device through operation of said lock valve, whereby while said device is maintained in operative condition said hoses may be wound on and unwound from said reel under substantially equal and relieved pressure conditions as said element is moved toward and away from said reel.

4. In combination, a material handling truck, a pump, a reel mounted on said truck, a hydraulically operated device mounted on an element movable vertically with respect to said truck, pipes extending from said pump to said reel, hoses extending from said reel to said device, said reel comprising a fixed shaft, rotatable hose receiving elements mounted on said shaft, said elements comprising a bushing positioned on said shaft, fixed fluid connections on said shaft to which are connected said pipes, passageways through said shaft for transmitting fluid to the interior of said bushing, a hub fixed with respect to said bushing and rotatable with said bushing on said shaft, hose connections on said hub to which are attached said hoses, other passageways through said bushing and hub leading to said hose connections, fluid sealing means on said bushing for preventing leakage of fluid, spaced annular plates on said hub for receiving said hoses therebetween, openings through said plates whereby each of the hoses attached to said hose connections may be led to a position between a pair of plates to be wound thereon, spring means constantly urging rotation of said plates in one direction with respect to said shaft whereby as said device is moved toward said reel said hoses will be wound thereon and as said device is moved away from said reel said hoses will be unwound therefrom, valve means on said truck for controlling the flow of fluid from said pump through said pipes and hoses to said device, a lock valve on said device intermediate said reel and device and in series with said hoses, means for relieving pressure in said hoses while maintaining pressure in said device through operation of said lock valve, whereby while said device is maintained in operative condition said hoses may be wound on and unwound from said reel under substantially equal and relieved pressure conditions as said device is moved toward and away from said reel.

5. In a material handling truck of the type having a fixed post, a source of fluid pressure, a fluid actuated element normally positioned near the lower end of said fixed post, means for raising said element above said fixed post, a reel on the upper part of said post at a location approximately midway between the lowermost and uppermost positions to which said element may be moved, a fluid pressure line extending from said source of fluid pressure to a fixed portion of said reel, a flexible hose extending from said reel to said fluid actuated element, means associated with said reel for transmitting fluid pressure from said fixed part of said reel to said hose and said element, means for thereafter maintaining pressure at said element while relieving pressure in said hose, means for constantly urging said reel in a direction to wind said hose up on said reel whereby as said fluid actuated element approaches said reel said hose will be wound thereon and as said fluid actuated element moves away from said reel said hose will be payed out.

6. In a truck of the type described, a fixed post on said truck, a fluid pump for providing fluid under high pressure, fluid receiving conduits connected to said pump, a valve intermediate said pump and conduits for selective feeding of fluid under pressure to one or the other of said conduits, a reel mounted on the upper end of said post having a fixed part and a rotatable part, two hoses wound side by side on said rotatable part of said reel, means at said reel connecting one conduit with one hose and the other conduit with the other hose, means constantly urging said rotatable part of said reel to wind up said hoses, a device for handling material including a fluid actuated element, means for moving said device up and down substantially equal distances beyond said reel, said fluid actuated element movable in one direction by fluid pressure from said pump through one hose and movable in the other direction by fluid pressure from said pump through the other hose, means associated with said element for maintaining high fluid pressure provided through either hose at said element, means for relieving thereafter the pressure in the high pressure hose while maintaining the high pressure at said element so that the pressures in both hoses will be substantially equal and low enough to permit winding of both hoses on said reel as said element may thereafter be moved toward or away from said reel.

7. In a truck of the class described, a fixed post, a carriage movable up and down within limits in a direction parallel to said post, a hydraulic operated material manipulating element mounted on said carriage, a reel affixed to said post at a position substantially midway between the upper and lower limits of movement of said element, a fluid pump on said truck, a fixed conduit leading from said pump to said reel, a hose running from said reel to said element, fluid tight means at said reel connecting said conduit to said hose, whereby fluid pressure provided by said pump will actuate said element, means between said pump and reel for relieving the pressure in said hose and means between said hose and element for maintaining fluid pressure at said element when the pressure in said hose is relieved.

References Cited in the file of this patent

UNITED STATES PATENTS

| | | |
|---|---|---|
| 1,227,646 | Metz | May 29, 1917 |
| 1,955,154 | Temple | Apr. 17, 1934 |
| 2,457,366 | Guerin | Dec. 28, 1948 |
| 2,611,498 | Broersma | Sept. 23, 1952 |
| 2,622,751 | Shaffer | Dec. 23, 1952 |
| 2,629,630 | Roark | Feb. 24, 1953 |
| 2,724,520 | Overbeck | Nov. 22, 1955 |
| 2,736,445 | Hobin | Feb. 28, 1956 |
| 2,823,074 | Bernard | Feb. 11, 1958 |